United States Patent
Hsiao et al.

(10) Patent No.: US 9,372,765 B2
(45) Date of Patent: Jun. 21, 2016

(54) SYSTEM AND METHOD FOR RECOVERING SYSTEM STATUS CONSISTENTLY TO DESIGNED RECOVERING TIME POINT IN DISTRIBUTED DATABASE

(71) Applicant: National Tsing Hua University, Hsinchu (TW)

(72) Inventors: Hung-Chang Hsiao, Tainan (TW); Chi-Tsun Liao, New Taipei (TW); Chia-Ping Tsai, Kaohsiung (TW); Yeh-Ching Chung, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 220 days.

(21) Appl. No.: 14/271,501

(22) Filed: May 7, 2014

(65) Prior Publication Data

US 2015/0248421 A1    Sep. 3, 2015

(30) Foreign Application Priority Data

Mar. 3, 2014 (TW) ............................. 103107071 A

(51) Int. Cl.
*G06F 17/00* (2006.01)
*G06F 11/14* (2006.01)

(52) U.S. Cl.
CPC ........ *G06F 11/1471* (2013.01); *G06F 11/1435* (2013.01); *G06F 2201/80* (2013.01); *G06F 2201/84* (2013.01)

(58) Field of Classification Search
USPC ............................ 707/639–640, 674; 726/24
See application file for complete search history.

(56) References Cited

U.S. PATENT DOCUMENTS

| | | | |
|---|---|---|---|
| 2008/0027998 A1* | 1/2008 | Hara ................. | G06F 17/30088 |
| 2009/0313503 A1* | 12/2009 | Atluri ................. | G06F 11/1453 |
| | | | 714/19 |
| 2011/0197279 A1* | 8/2011 | Ueoka ..................... | G06F 21/56 |
| | | | 726/24 |
| 2014/0172944 A1* | 6/2014 | Newton .................. | H04L 67/42 |
| | | | 709/202 |

* cited by examiner

*Primary Examiner* — Hung T Vy
(74) *Attorney, Agent, or Firm* — Birch, Stewart, Kolasch & Birch, LLP

(57) ABSTRACT

A method for recovering system status consistently to a designed recovering time point in a distributed database, wherein the distributed database comprises a primary server and multiple region servers, comprising: when the region servers detect a change of system status, analyzing an event for the change to generate an event log and storing the event log to the database; after a preset condition, the region servers generate a snapshot respectively; when the primary server receives the instruction to recover the system status to a designed time point, indicates the region servers to implement: reading the event log and snapshots stored in region servers; finding the snapshot closest to the designed time point; finding the event log and snapshot corresponding to an time interval between the time recorded in the snapshot and the designed time point to recover the system status to the designed time point.

3 Claims, 3 Drawing Sheets

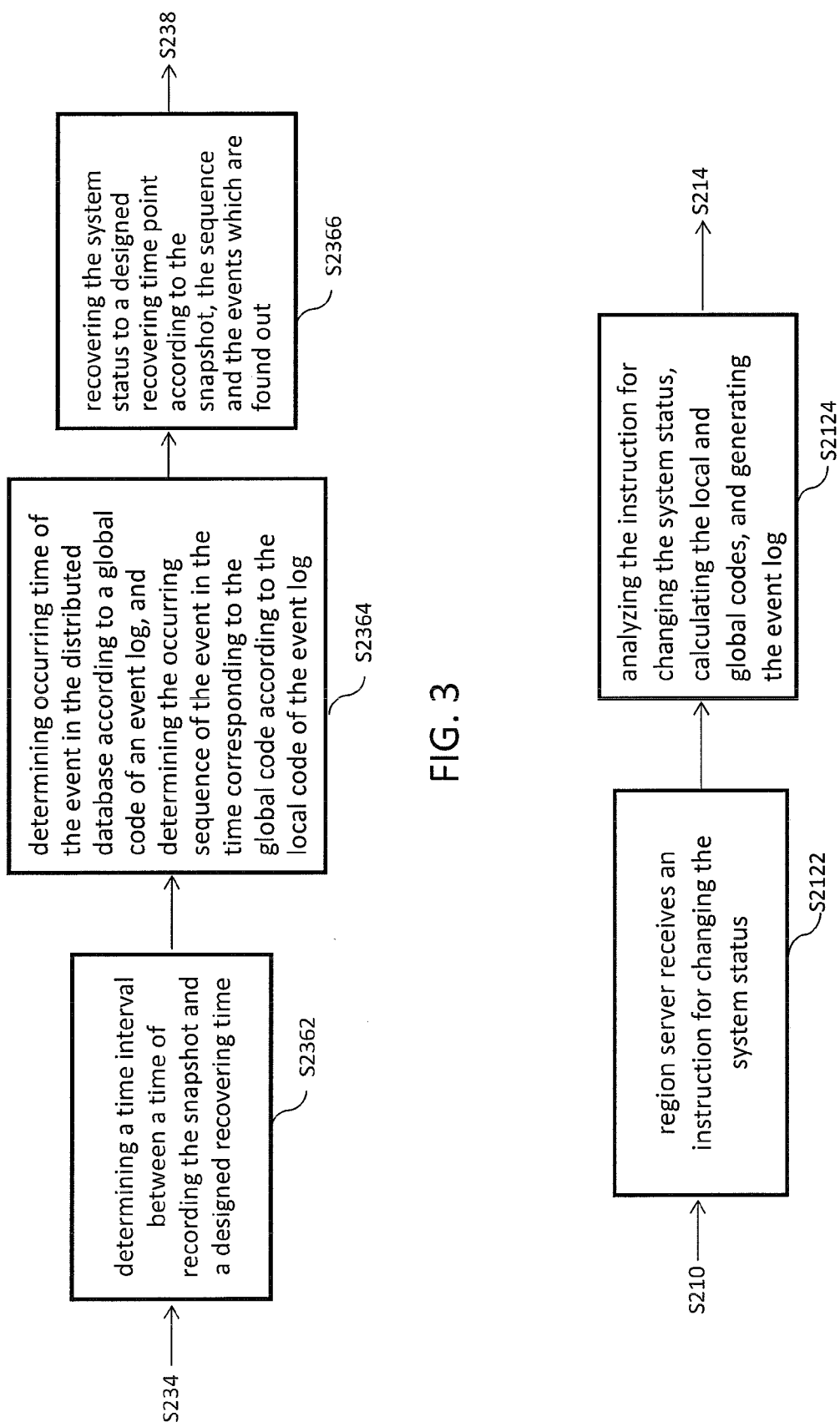

SYSTEM AND METHOD FOR RECOVERING SYSTEM STATUS CONSISTENTLY TO DESIGNED RECOVERING TIME POINT IN DISTRIBUTED DATABASE

BACKGROUND OF THE INVENTION

1. Field of the Invention

A method and system for recovering a system status, and more particularly to a method and system for recovering the system status to the same time point in a distributed database.

2. Description of Related Art

The rapid evolution of the internet technology change the way people use the internet, and through the exchange by the internet, people around the world can share information in real time, and zero distance. For example, most websites have transformed into the Web2.0 type. The biggest difference between Web2.0 and traditional website is the source of information. The operator of Web2.0 typically provides an information platform, and through the sharing by people to achieve the purpose of information spreading. Although the Web2.0 can get more timely and adequate information through the accumulation of knowledge, relatively, because the user provided information for a long time, the cumulative amount of data is much greater than the resources required for the traditional sites, which resulting in system capacity overloaded.

In order to solve the above problems, the technology of non-relational database (No SQL) is gradually applied to store a variety of big data. Compared to the traditional relational database, the advantage of the non-relational database is that it can be horizontally expanded, that is, the elasticity of capacity of such database. When the database is overloaded, the capacity can be adjusted and expanded its capacity at any time. The common non-relational database is HBase, and the HBase is a distributed database. The HBase uses Apache Hadoop as a file system. HBase is divided into the primary server and the region server. The primary server and the region server are connected. When the primary server detects that one of the region server is damaged, it can recover the data in the region server to the status stored previously.

In the current HBase system, although the primary server can automatically detects the damage of the region server and recover the data to the previous status, but it cannot recover other system status such as the distribution of the region server to a specific time point. Besides, the historical record based for recovering the system to a specific time point is only the record in a period of time, that is, when recovering the system, it can only recover the data using the period of time as a unit. Therefore, it cannot recover the data to a specific time point. Base of the above content, in the present technology field, it requires a method for recovering the system status to the same time point for the non-relational database, and ensuring that the recovery of the system status has consistency.

SUMMARY OF THE INVENTION

The present invention provides: a method for recovering a system status of a primary server and multiple region servers consistently to a designed recovering time point in a distributed database having the primary server and the multiple region servers, comprising: when one of the multiple region servers detecting every change of the system status, the region server analyzing an event of the change of the system status to generate an event log, and storing the event log to the database, wherein the event logs respectively have a time vector to determine an occurring sequence of the events; after reaching a preset condition the region servers respectively generate a snapshot, wherein the snapshot is a formatted system data file; and when the primary server receiving an instruction for recovering the system status to a designed recovering time point, the primary server ordering the region servers to execute the following steps: step 1: obtaining the event logs and the snapshots stored in the region servers; step 2: finding out the snapshots which are closest to the designed recovering time point; and step 3: finding out corresponding events according to a time interval between a time of recording the snapshot and the designed recovering time point, and recovering the system data file recorded by the snapshot to recover the system status back to the system status of the designed recovering time point according to the corresponding events.

Wherein, the time vector comprises a local code and a global code.

Wherein, the step 3 comprises the following steps: determining the time interval between the time of recording the snapshot and the designed recovering time point; determining occurring time of the event in the distributed database according to the global code of the event log, and determining the occurring sequence of the event in a time corresponding to the global code according to the local code of the event log; and recovering the system status to the designed recovering time point according to the snapshot, the sequence of finding out and the events.

Wherein, the step of generating the event log further comprises the following steps: the region server receiving an instruction for changing the system status; and analyzing the instruction for changing the system status, calculating the local/global codes, and generating the event log.

Wherein, the snapshot further comprises the files corresponding to the events.

Another aspect of the present invention provides: a system for recovering system status to a same time point in a distributed database, comprising: a primary server, having a main processor and at least one main memory; and multiple region servers, respectively having at least one local processor and at least one local memory; wherein, when the primary server receiving an instruction for recovering the system status to a designed recovering time point, the primary server ordering the region servers to execute the following steps: step 1: obtaining the event logs and the snapshots stored in the region servers; step 2: finding out the snapshots which are closest to the designed recovering time point; and step 3: finding out corresponding events according to a time interval between a time of recording the snapshot and the designed recovering time point, and recovering the system data file recorded by the snapshot to recover the system status back to the system status of the designed recovering time point according to the corresponding events.

BRIEF DESCRIPTION OF THE DRAWINGS

FIG. 3 is a flow chart diagram according to another embodiment of the present invention method; and FIG. 4 is a flow chart diagram according to another embodiment of the present invention method.

DETAILED DESCRIPTION OF THE PREFERRED EMBODIMENT

Figure 1:
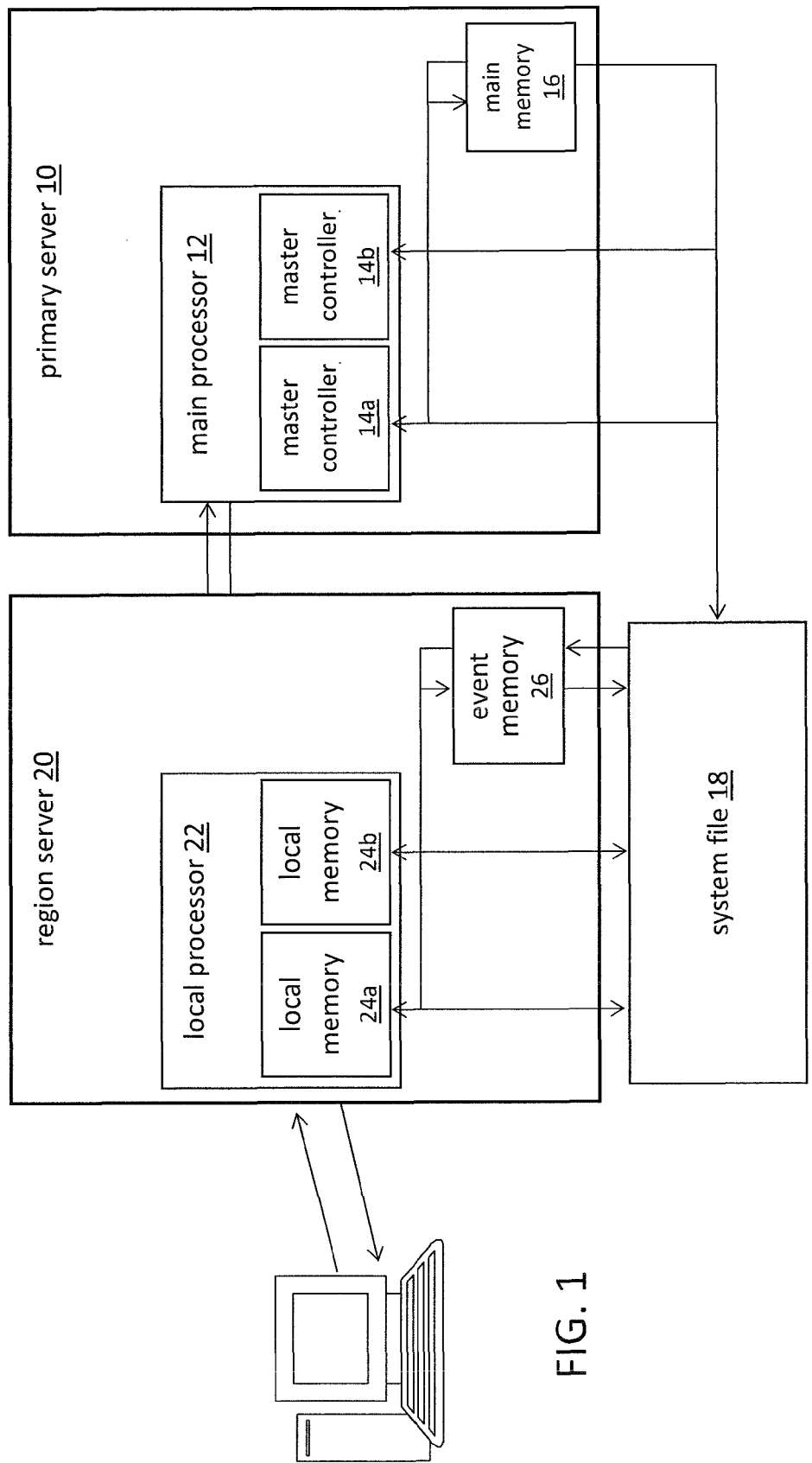
FIG. 1 is a system architecture diagram according to an embodiment of the present invention system.

For describing the content of the present disclosure more detailed and complete. The following content provides an illustrative description for the implementation aspect and the embodiments of the present invention. However, they are not the only way to implement and apply the present invention. In the embodiments, they cover the features of multiple specific embodiments and the steps and order to operate and construct the specific embodiments. However, it can also use other specific embodiment to achieve the same and equivalent function and step order.

Unless otherwise defined in this specification, the meaning of science and technical terms used herein is the same with the meaning understood by the person having ordinary skill in the art. Besides, under no conflict of the context, the use of singular noun in the specification covers the plural noun type; the use of the plural noun also covers the singular type of that noun.

The "distributed database" in this specification is combined by multiple hosts to make multiple users share the structured data table. In addition, in the embodiment, the distributed database is a master-slave architecture and divides the system into several data blocks. The system comprises a primary server and multiple region servers. The primary server is for managing the communication, coordination of the region servers, and managing file directory.

The region servers are respectively responsible for one data block, and manage the access of the data in the data block.

In this specification the "system status" means the status of the files in the system and the status of the data block managed by the region server.

When the data table is added, deleted, or modified by the users, or the region server is sorting or moving the data, or data transaction of resetting the data range, closing or adding the data by the users, the system status, the status of every data block, and the status of the region server are changed. At this time, the system status is changed. For example, the arrangement and placement location of the files within the system is executing by the region server. When the files are only moved to a different region server, but the files are not added, modified, or deleted by the users. Although for the user, the file status seen by the users is the same. However, the data range managed by the region server is changed according to the above. Therefore, the status of the region server is different from the status before moving the files, and the system status is changed.

Every time when the files are added, deleted, modified or moved, etc., they are regarded as an "event" in this specification. And an "event log" is a record for the occurring situation of these events. For example, but not limited to the change of the file identification name or address caused by the event, the content of the event, and occurring time of the event. Wherein, multiple event logs can be combined into one file for the system to access.

The event log in this specification further comprises "local code" and "global code". The local code provides code according to the sequence of the event handing by the region server. For example, in this embodiment, the code used is the serial number in a small to big order. According to the magnitude of the serial number, it can determine the occurring order of the event. The global code provides code according to the time of the entire system. For the entire system, the global code is an event code of changing of the status of the region server; the local code is an event code of operating the table by user.

"Preset condition" in this specification is different according to different systems. For example, it can depend on a preset time interval (such as, but not limited to: generate a snapshot every hour), or a preset condition (such as, but not limited to: per occurring one hundred events), but is not limited thereto.

The "snapshot" in this specification is a formatted system data file for recording the status of the system at a certain moment. Besides, to avoiding a long recording process and decreasing the system space occupied, every snapshot will space a long time. Assuming that the system generates a snapshot once a day, the snapshot generated is the system state at that moment. In other words, it can recover the system back to the time point when the snapshot is generated according to that snapshot. In one embodiment, the snapshot generated by the system includes the files in the preset conduction, that is, includes the added files, modified files or deleted files. It also includes the status of region server.

"Directory" in this specification is used for recording the physical address of the files in the file system. The region server can obtain the physical address of the file through reading the directory, and further doing access.

With reference to FIG. 1, FIG. 1 is a system architecture diagram according to an embodiment of the present invention system. In this system, it comprises a primary server 10, and multiple region servers 20 (It only shows one region server in FIG. 1). Wherein, the primary server 10 is for managing the entire system status. In addition, when it detects that the region server 20 stop working, the primary server 10 will send a command, coordinate the other region servers in operation to take control the stopped region server 20.

Wherein, the primary server 10 has a main processor 12, a main memory 16, and a system file 18. The main processor 12 can be a central processor for example but not limited to it. In this embodiment, the main processor 12 has two master controllers 14a, 14b. The master controllers 14a, 14b are used to handle the flowing into and out of the data. When the master controller 14a is failed, the master controller 14b will detect that the master controller 14a has failed, and take control the work of the master controller 14a. The main memory 16 is used for temporarily saving an updated directory. When reach a preset time (for example: a preset time interval or a preset condition such as every hour or after occurring one hundred events, writing the data inside the main memory 16 to the file system 18), The master controller 14a or 14b will save the directory inside the main memory 16 to the system file 18.

The region servers 20 are respectively responsible for adding, deleting, modifying and moving the data in one data block. The region server 20, for example, has a local processor 22, an event memory 26. The region server 20 can also read the file system 18. In this embodiment, the local processor 22 has multiple local memories (it only shows two local memories 24a, 24b in FIG. 1). The local processor 22 is used for handling the flowing into and out of the data. The local memories 24a, 24b is used for temporarily saving an update operation. After a certain amount of operations or a period of time, the data in the local memories into will be written into the file system 18. The event memory 26 is used to handle event logs. When pass a preset time (for example: a preset time interval or a preset condition such as every hour or after occurring one hundred events, writing the data inside the event memory 26 to the file system 18).

Although the primary server 10 is used for managing the data directory in the system and coordinating the cooperation among the region servers 20, but, in another embodiment, the primary server 10 can also manage the data of the region servers 20 at the same time.

And in FIG. 1, when a user 1 wants to read data of a table, the user 1 connects to the region server 20. The local processor 22 of the region server 20 searches data of the table from the local memories 24*a*, 24*b*, and the file system 18, and the local processor 22 returns data of the table to the user 1.

When the user 1 wants to write data to a table, after the region server 20 receives the instruction, the local processor 22 will pass the files to the local memories 24*a*, 24*b* and generate an event log to the event memory 26. Then, the local processor 22 will return a successful passing message to the use 1.

Figure 2:
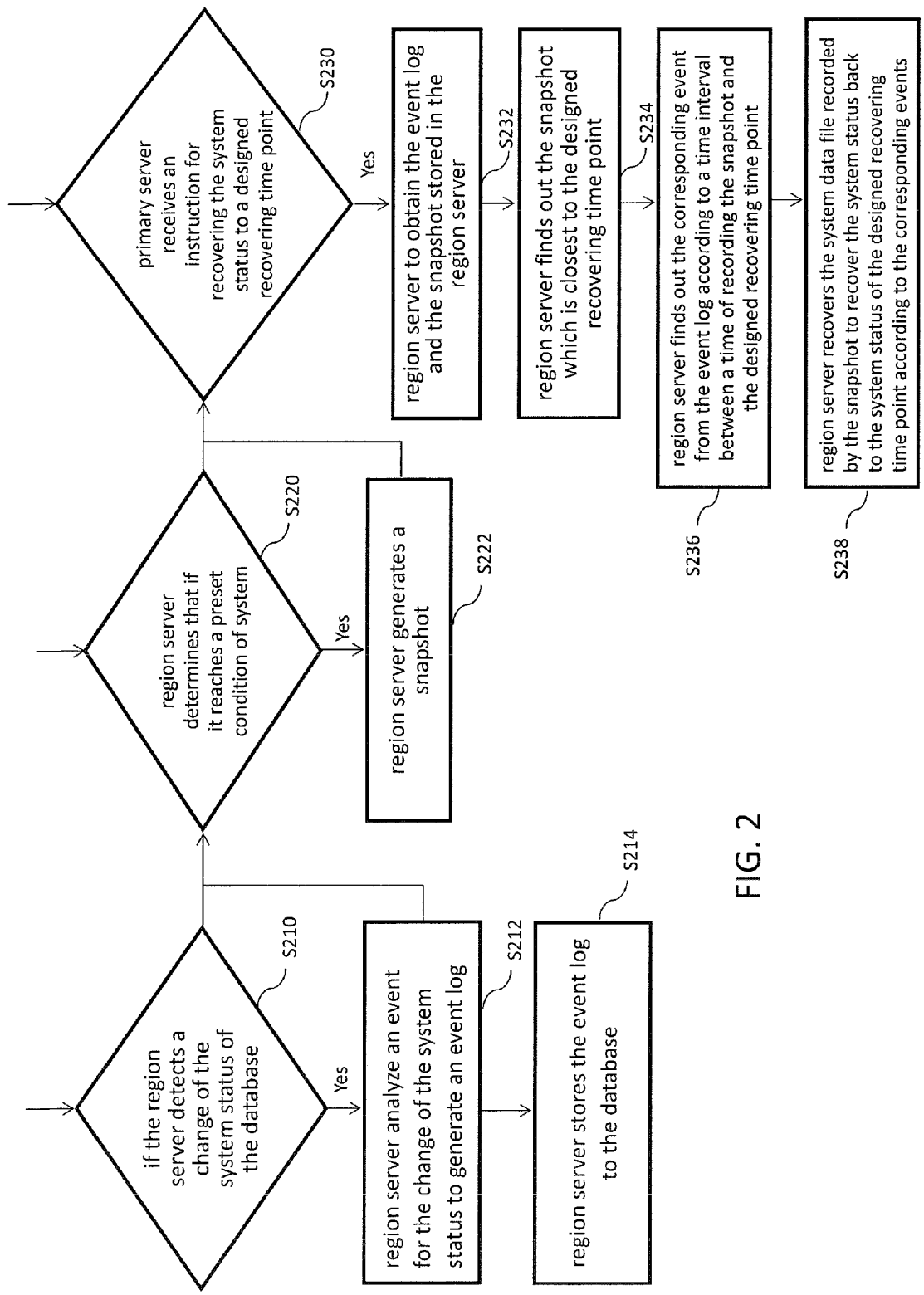
FIG. 2 is a flow chart diagram according to an embodiment of the present invention method.

FIG. 2 is a flow chart diagram according to an embodiment of the present invention method. The flow of the present embodiment is executed on the system architecture in FIG. 1. The method comprises a step S210 that if the region server detects a change of the system status of the database, a step S212 that the region server analyze an event for the change of the system status to generate an event log, a step S214 that saving the event log to the database, a step S220 that the region sever determine that if it reaches a system preset condition, a step S222 that the region server respectively generate a snapshot, a step S230 that if the primary server receives an instruction for recovering the system status to a designed recovering time point, a step S232 that the region server obtains the event log and the snapshot stored in the region server, a step S234 that the region server find out the snapshot which is closest to the designed recovering time point, a step S236 that the region server bases on a time interval between a time of recording the snapshot and the designed recovering time point, finding out the corresponding event from the event log, and a step S238 that the region server recover the system status to the system status of the designed recovering time point according to the system data file recorded by the snapshot.

The step S210 is that the region server determines that if it exist an instruction for changing the system status. When the region server receives an instruction for changing the system status, the region server will analyze this event, and generates an event log according to system changing property (for example: file adding, deleting, and moving), system changing object (that is: which file is changed), executing time, and sequence of operations. And the region server stores the event log to the database (S214).

In addition, in the step S220 is that the region server determines that if it reaches a preset condition of system, and if it meets the preset condition, the region server generates a snapshot (S222) to record the system status at that moment. When the database requires recovering the system, it can recover the file data accordingly.

In addition, the step S230 is that if the primary server receives an instruction for recovering the system status to a designed recovering time point, when the primary server detects the instruction for recovering the system status, the primary server orders the region server to obtain the event log and the snapshot stored in the region server (S232), and the region server finds out the snapshot which is closest to the designed recovering time point (S234), and the region server finds out the corresponding event from the event log according to a time interval between a time of recording the snapshot and the designed recovering time point (S236), and a step S238 that the region server recovers the system data file recorded by the snapshot to recover the system status back to the system status of the designed recovering time point according to the corresponding events. Wherein, in another embodiment, the sequence of steps S210, S220 and S230 can exchange, but not limited to it.

FIG. 3 is a flow chart diagram according to another embodiment of the present invention method. As shown in FIG. 3, the step S236 comprises a step S2362 that determining a time interval between a time of recording the snapshot and a designed recovering time, a step S2364 that determining occurring time of the event in the distributed database according to a global code of an event log, and determining the occurring sequence of the event in the time corresponding to the global code according to the local code of the event log, and a step S2366 that recovering the system status to a designed recovering time point according to the snapshot, the sequence and the events which are found out.

FIG. 4 is a flow chart diagram according to another embodiment of the present invention method. Wherein, the step S212 comprises: The region server receives an instruction for changing the system status (S2122), and analyzes the instruction for changing the system status, calculating the local and global codes, and generating the event log (S2124).

This disclosure is intended to disclose a system and method for recovering the system status to the same time point in the distributed database. The system and method can recover the database to the same time point to reduce data errors and the risk of loss.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A method for recovering a system status of a primary server and multiple region servers consistently to a designed recovering time point in a distributed database having the primary server and the multiple region servers, comprising:

when one of the multiple region servers detects every change of the system status, the region server analyzing an event of the change of the system status to generate an event log, and storing the event log to the database, wherein the event logs respectively have a time vector to determine an occurring sequence of the events;

after reaching a preset condition the region servers respectively generating a snapshot, wherein the snapshot is a formatted system data file; and when the primary server receives an instruction for recovering the system status to a designed recovering time point, the primary server ordering the region servers to execute the following steps:

step 1: obtaining the event logs and the snapshots stored in the region servers;

step 2: finding out the snapshots which are closest to the designed recovering time point; and step 3: finding out corresponding events according to a time interval between a time of recording the snapshot and the designed recovering time point, and recovering the system data file recorded by the snapshot to recover the system status back to the system status of the designed recovering time point according to the corresponding events, wherein the time vector comprises a local code and a global code, and wherein, the step 3 comprises the following steps:

determining the time interval between the time of recording the snapshot and the designed recovering time point;

determining occurring time of the event in the distributed database according to the global code of the event log, and determining the occurring sequence of the event in a time corresponding to the global code according to the local code of the event log; and recovering the system status to the designed recovering time point according to the snapshot, the sequence of finding out and the events.

2. The method according to claim 1, wherein, the step of generating the event log further comprises the following steps:
- the region server receiving an instruction for changing the system status; and
- analyzing the instruction for changing the system status, calculating the local/global codes, and generating the event log.

3. The method according to claim 1, wherein, the snapshot further comprises the files corresponding to the events.

* * * * *